(12) United States Patent
Black et al.

(10) Patent No.: US 11,689,704 B2
(45) Date of Patent: *Jun. 27, 2023

(54) USER SELECTION OF VIRTUAL CAMERA LOCATION TO PRODUCE VIDEO USING SYNTHESIZED INPUT FROM MULTIPLE CAMERAS

(71) Applicant: Sony Interactive Entertainment Inc., Tokyo (JP)

(72) Inventors: Glenn Black, San Mateo, CA (US); Michael Taylor, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/819,624

(22) Filed: Aug. 13, 2022

(65) Prior Publication Data

US 2022/0394227 A1 Dec. 8, 2022

Related U.S. Application Data

(63) Continuation of application No. 16/871,819, filed on May 11, 2020, now Pat. No. 11,431,952.

(51) Int. Cl.
| | |
|---|---|
| *H04N 13/117* | (2018.01) |
| *G06F 3/01* | (2006.01) |
| *H04N 13/156* | (2018.01) |
| *H04N 23/54* | (2023.01) |
| *H04N 23/90* | (2023.01) |
| *A63F 13/35* | (2014.01) |

(Continued)

(52) U.S. Cl.
CPC .......... *H04N 13/117* (2018.05); *G06F 3/013* (2013.01); *G06F 3/017* (2013.01); *H04N 13/156* (2018.05); *H04N 23/54* (2023.01); *H04N 23/90* (2023.01); *A63F 13/35* (2014.09); *A63F 13/525* (2014.09); *A63F 13/65* (2014.09); *A63F 2300/53* (2013.01); *A63F 2300/69* (2013.01)

(58) Field of Classification Search
CPC .. H04N 13/117; H04N 13/156; H04N 5/2253; H04N 5/47; G06F 3/013; G06F 3/017
USPC ............................ 345/156; 348/39; 715/849
See application file for complete search history.

(56) References Cited

U.S. PATENT DOCUMENTS

| | | | |
|---|---|---|---|
| 2014/0129990 A1* | 5/2014 | Xin ....................... | G06F 3/0425 715/849 |
| 2014/0184496 A1* | 7/2014 | Gribetz ............... | G06F 3/04842 345/156 |

(Continued)

OTHER PUBLICATIONS

Takayama Yuji Head-Mounted Display Device and Method for Controlling Head-Mounted Display Device Feb. 15, 2018 Canon KK Application No. JP20160156858 Aug. 9, 2016 Global Dossier paragraphs 2, 12, 13; English.*

(Continued)

*Primary Examiner* — Prabodh M Dharia
(74) *Attorney, Agent, or Firm* — John L. Rogitz (57) ABSTRACT

A space in which an augmented reality (AR) computer simulation is played is mapped by multiple cameras. An AR video game player can select a location in space from which the AR player wishes to have a view of the space, including himself. Using the mapping of the space a synthesized video is generated as if from a camera located at the location in space selected by the player.

20 Claims, 5 Drawing Sheets

(51) Int. Cl.
  *A63F 13/65* (2014.01)
  *A63F 13/525* (2014.01)

(56) References Cited

U.S. PATENT DOCUMENTS

2018/0348987 A1* 12/2018 Sawaki ................. G06F 3/0338
2019/0045157 A1*  2/2019 Venshtain ................. G06T 7/75

OTHER PUBLICATIONS

Takayama Yuji Head-Mounted Display Device and Method for Controlling Head-Mounted Display Device Feb. 15, 2018 Canon KK Application No. JP20160156858 Aug. 9, 2016 Global Dossier paragraphs 2, 12, 13; Japanese.*

* cited by examiner

Alternative head mounted camera

USER SELECTION OF VIRTUAL CAMERA LOCATION TO PRODUCE VIDEO USING SYNTHESIZED INPUT FROM MULTIPLE CAMERAS

FIELD

The present application relates to technically inventive, non-routine solutions that are necessarily rooted in computer technology and that produce concrete technical improvements.

BACKGROUND

As understood herein, a player of an augmented reality (AR) computer simulation such as an AR video game may wish to see himself from a vantage point that the user himself can choose as the user proceeds through the AR environment.

SUMMARY

Mesh networking may be used to combine videos from multiple camera sources such as augmented reality (AR) headsets. An aggregated video may be produced of the space in which the cameras are disposed and a virtual camera may then be simulated at any point in the space to generate a synthetic video of the space from the location and orientation of the virtual camera to enable users to observe themselves and others from the vantage point of the virtual camera. The synthetic video is synthesized from the real-world videos taken by the various camera sources. Non-limiting examples of generating synthetic video from multiple video frames are set forth in USPPs 20170221218 and 20170111652, incorporated herein by reference.

A user may identify the location and orientation of the virtual camera from whose vantage point the user wishes to see a video using any appropriate AR/VR indication technique, such as a laser pointer, eye tracking with gesture (orientation). Virtual camera focus and field of view (FOV) also can be adjusted using, e.g., gestures.

Thus, a real-world space may be mapped using multiple simultaneous perspectives. U.S. Pat. No. 10,549,186, owned by the instant assignee or corporate relative thereof and incorporated herein by reference and entitled "Multipoint SLAM capture" provides an example technique for constructing a real-world map from multiple cameras.

The real-world synthetic video may be augmented with virtual reality (VR) objects. Multiple viewpoints can be used to update the real-world map and interpolation between viewpoints used to fill in gaps in the feature space. Machine learning may be employed to infer teammate intent. Cameras may be attached to virtual moving objects (cars, drones, etc.) Virtual dollies may be used for filmmaking. Points within virtual spaces may be designated to pan camera views between. Shadowed regions in the imaged space may be highlighted to prompt a user to move there to film the real-world shadow region. Fast-moving objects may be automatically selected to train the cameras on such objects. Both open lop real world spaces and closed loop spaces (within a room) are contemplated and the virtual camera may be "placed" anywhere, with actions of people being predicted. For a self-image, GPS and motion sensors may be employed so that an avatar of the user may be placed in space as would be seen from the virtual camera vantage point.

Accordingly, an apparatus includes at least one processor programmed with instructions which are executable by the processor to identify at least a location in space for a virtual camera. The instructions are executable to access plural videos of the space generated by respective plural cameras to generate a synthesized video of the space from a vantage point of the virtual camera. Also, the instructions are executable to display the synthesized video on at least one head-mounted apparatus.

The head-mounted apparatus may include an augmented reality head-mounted display (HMD) or it may include an augmented reality eyeglasses.

In non-limiting examples a first one of the plural cameras is on the head-mounted apparatus. If desired, the plural cameras may be mounted on respective head-mounted apparatuses. In some implementations the vantage point of the virtual camera includes both a location and an orientation of the virtual camera.

In example embodiments, the instructions can be executable to identify the location in space of the virtual camera based at least in part on imaging light from a laser. In other examples the instructions can be executable to identify the location in space of the virtual camera based at least in part on imaging a gesture of a wearer of the head-mounted apparatus. In still other examples the instructions may be executable to identify the location in space of the virtual camera based at least in part on imaging eyes of a wearer of the head-mounted apparatus. If desired, the instructions may be executable to present on the head-mounted apparatus an indication of a region in space requiring video imaging.

In another aspect, an assembly includes at least first and second head-mounted devices (HMD), each comprising at least one respective camera. The assembly also includes at least one processor programmed with instructions executable to configure the processor to identify at least a location in space for a virtual camera, and generate, using images from the cameras of the HMDs, a video from a vantage point of the location of the virtual camera. The instructions are executable to present the video on at least one of the HMDs.

In another aspect, a method includes accessing plural videos of a space taken by respective real-world cameras. The method also includes generating a synthesized video from the plural videos from a vantage point distanced from respective locations of the real world cameras based on an identification of the vantage point by a user. The method includes presenting the synthesized video on a head-mounted apparatus worn by the user.

The details of the present application, both as to its structure and operation, can be best understood in reference to the accompanying drawings, in which like reference numerals refer to like parts, and in which:

DETAILED DESCRIPTION

This disclosure relates generally to computer ecosystems including aspects of consumer electronics (CE) device networks such as but not limited to computer game networks. A system herein may include server and client components, connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Figure 1:
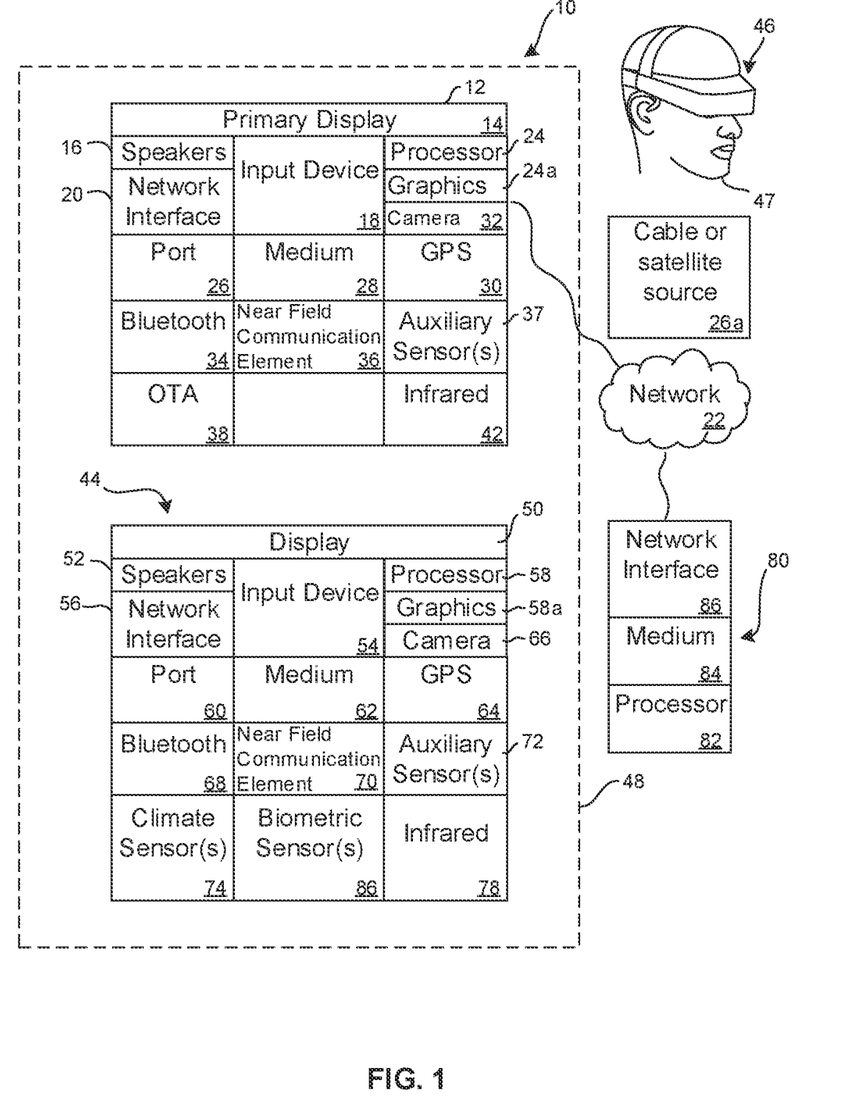
FIG. 1 is a block diagram of an example system consistent with present principles.

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24 including. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignment purposes described further below. The source 26a when implemented as a game console may include some or all of the components described below in relation to the CE device 44.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media. Also, in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as a VR headset worn by a player 47 as shown. In the example shown, only two CE devices 44, 46 are shown, it being understood that fewer or greater devices may be used.

In the example shown, to illustrate present principles all three devices 12, 44, 46 are assumed to be members of an entertainment network in, e.g., a home, or at least to be present in proximity to each other in a location such as a house. However, present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller (also referred to as "console"), and accordingly may have one or more of the components described below. The first CE device 44 may be a remote control (RC) for, e.g., issuing AV play and pause commands to the AVD 12, or it may be a more sophisticated device such as a tablet computer, a game controller communicating via wired or wireless link with the AVD 12, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. A graphics processor 58A may also be included. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid-state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server or an entire server "farm" and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

The methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the Internet.

Figure 2:
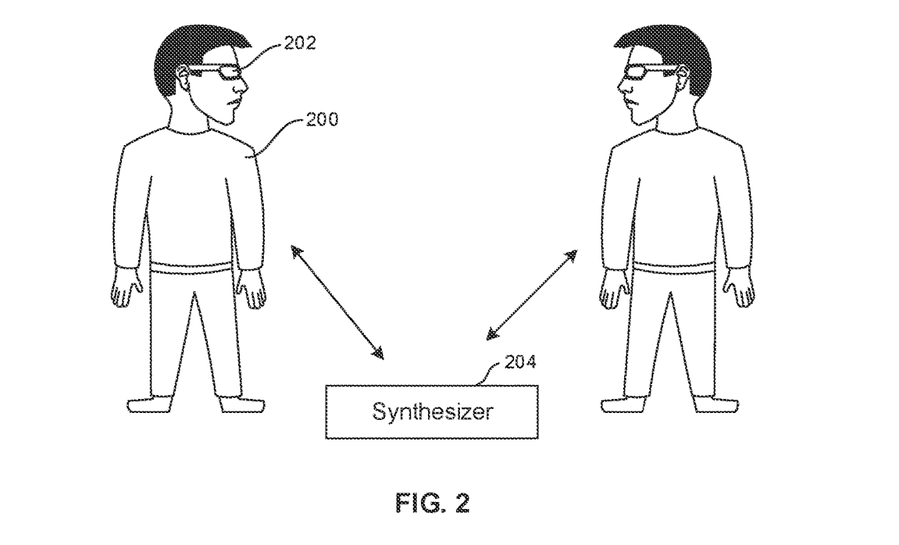
FIG. 2 illustrates an example AR environment.

Refer now to FIG. 2, which shows that plural users 200 may each wear a respective head-mounted apparatus (HMA) as but not limited to a computer game augmented reality (AR) head-mounted device (HMD) or a glasses-type apparatus described further below in reference to FIG. 4. Each HMA 202 includes one or more cameras that can image the space in which the user 200 is and that can also image the eyes of the user. The images typically in video format are sent via wireless links to a synthesizer computer 204. The synthesizer computer 204 may in some embodiments be implemented by a server or other computer or may be integrated into one or both of the HMAs 202. The wireless links may be, without limitation, any one or more of Bluetooth or Wi-Fi links.

Figure 3:
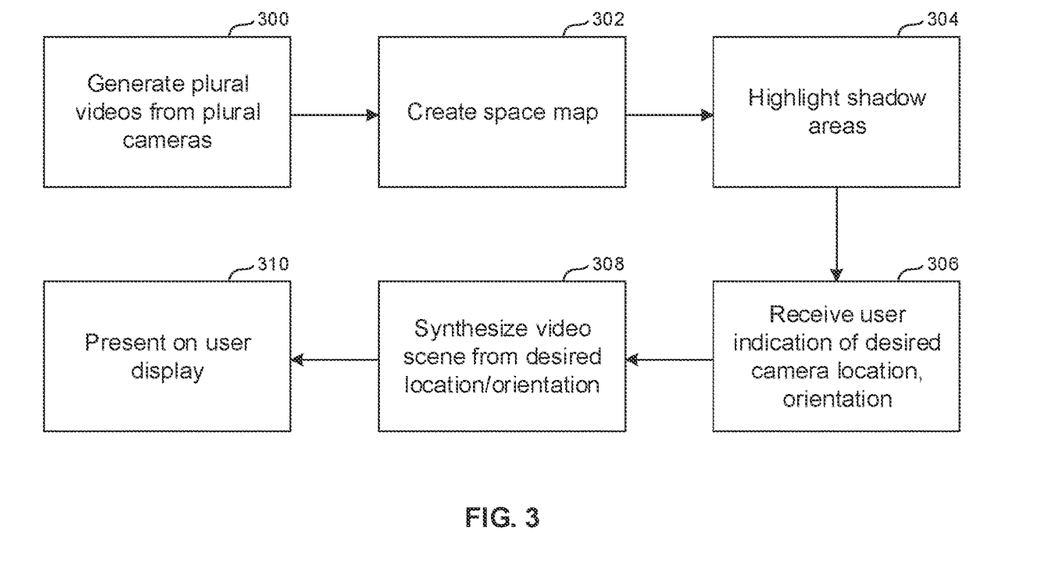
FIG. 3 illustrates in example flow chart format example logic consistent with present principles.

FIG. 3 illustrates overall logic that may be implemented by the synthesizer computer 204 shown in FIG. 2 or other computer described herein. Commencing at block 300, each of the HMAs 202 in FIG. 2 generates a respective video of the space in which the users 200 are located. An aggregated space map may be created at block 302 using the videos received at block 300. The above-referenced U.S. patent illustrates one example technique for the step at block 302.

Moving to block 304, if desired any "shadow" areas in the aggregated space map may be highlighted as described in greater detail herein. In other words, if no video images exist for a region of the space, those regions may be brought to the attention of one or more users 200 so that the users can move into the shadowed regions and image them.

Proceeding to block 306, a user indication of a location and if desired orientation of a virtual camera within the space from whose vantage point the user desires to observe a video of the space is received. The location and orientation of the virtual camera are distanced from the locations of the HMAs 202. Based on the indicated location (and if desired orientation) of the virtual camera, at block 308 a video scene is created by synthesizing video from the space map created at block 302. Example techniques for such synthesis may include interpolation between two frames from the real-world cameras and may implement the techniques described in the above-referenced U.S. patent publications. The synthesized video from the vantage point of the virtual camera located at the position and if desired orientation identified at block 306 is then displayed on a display such as one or more of the HMAs shown in FIG. 2.

Figure 4:
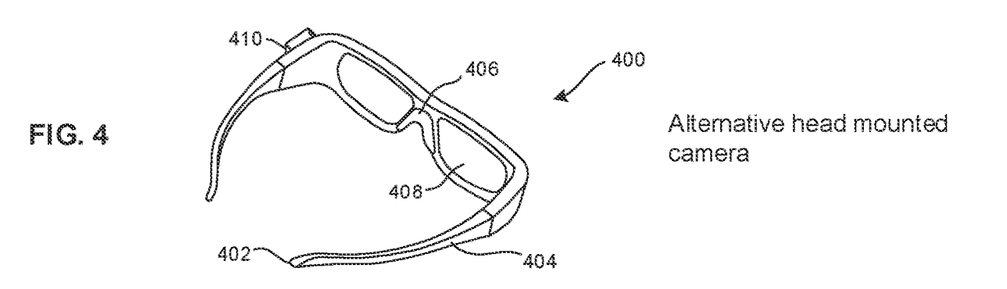
FIG. 4 illustrates an alternate head mounted implement configured as eyeglasses.

FIG. 4 shows an alternate HMA 400 configured as eyeglasses having left and right ear loops 402 merging with left and right templates 404, which in turn are connected at the front end by a bridge 406. Left and right AR displays may be mounted on the bridge 406, and a camera 410 may be mounted on the apparatus 400.

Figure 5:
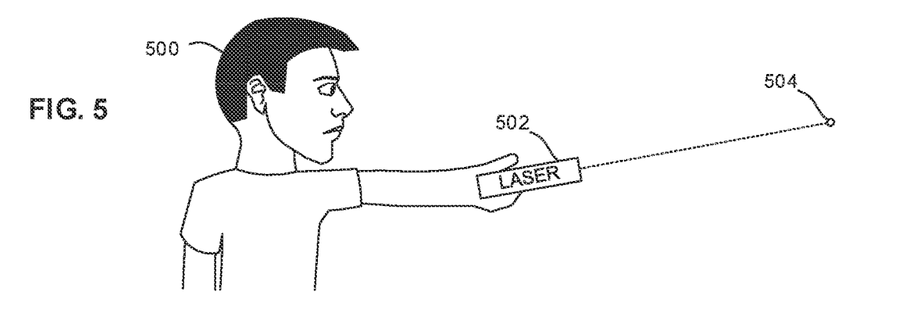
FIG. 5 illustrates a first technique for selecting a vantage point for a virtual camera.
Figure 6:
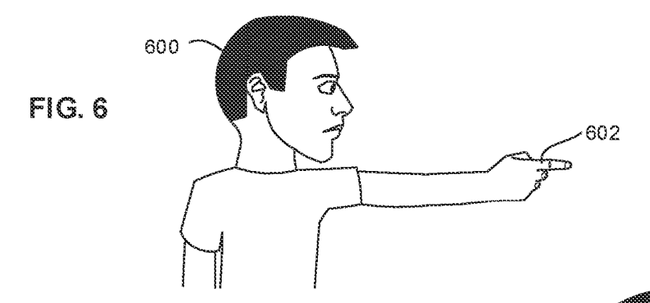
FIG. 6 illustrates a second technique for selecting a vantage point for a virtual camera.
Figure 7:
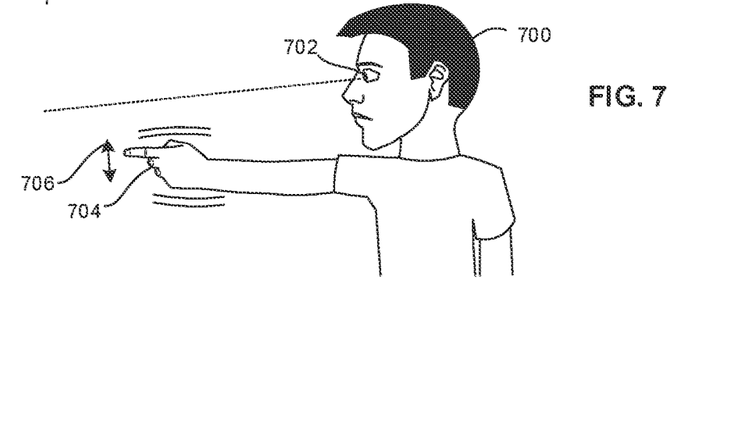
FIG. 7 illustrates a third technique for selecting a vantage point for a virtual camera.

FIGS. 5-7 illustrate example non-limiting techniques by which the location and orientation of the virtual camera from whose vantage point the synthesized video is generated may be identified. In FIG. 5, a user 500 manipulates a laser pointer 502 to illuminate a location 504 in space to indicate the desired location of the virtual camera. The location 504 may be imaged using, for example, an infrared (IR) camera and input to the synthesizer 204.

In FIG. 6 a user 600 points his finger 602 toward the desired location or makes another gesture understood to indicate a desired location, a gesture that may be imaged by any of the cameras described herein and input to the synthesizer computer 204. The synthesizer computer 204 may calculate a line of sight from the user's finger to the nearest surface in the space and identify the desired virtual camera location as being the intersection of the surface with the line of sight. The user 600 may turn the finger 602 or hand or make another orientation-type gesture to indicate the orientation of the virtual camera, e.g., whether it is pointed down from above or up from below.

FIG. 7 indicates that the line of sight described in the preceding paragraph may be ascertained using an image of a user 700 and tracking the eyes 702 of the user to determine the location of the virtual camera. The orientation of the virtual camera may be indicated using a gesture of the hand 704 moving as indicated by the arrows 706.

Voice recognition also may be used to identify the location and orientation of the camera. For example, the user might say "I want to see myself from on top of the building across the street", and the location and orientation of the virtual camera is identified accordingly.

Figure 8:
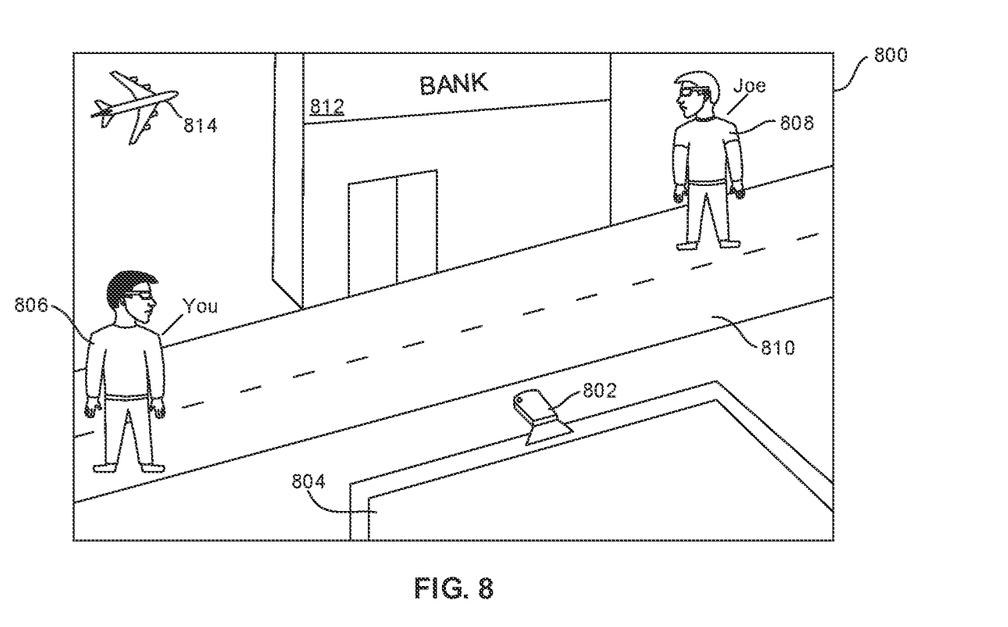
FIG. 8 illustrates a screen shot of an example AR synthesized video as though taken by a camera at a user-designated location.

FIG. 8 illustrates a synthesized video that may be presented on a video display 800 such as any of the displays disclosed herein from the vantage point of a location 802 of a virtual camera on top of a building 804 using videos from the HMAs of first and second users 806, 808 the identities of which may be indicated as shown. In the example shown, the users 806, 808 are walking down a region 810 of a physical space simulated to be a street along which the building 804 and other buildings such as a bank 812 are simulated to appear. The buildings 804, 812 may be physical as well as a fast-moving object 814 such as a plane, or one or more of the video objects may be virtual objects superimposed onto a video of the physical space. In this way, the user 806 who defined the location 802 of the virtual camera can see himself as he would be seen from atop the building 804.

Figure 9:
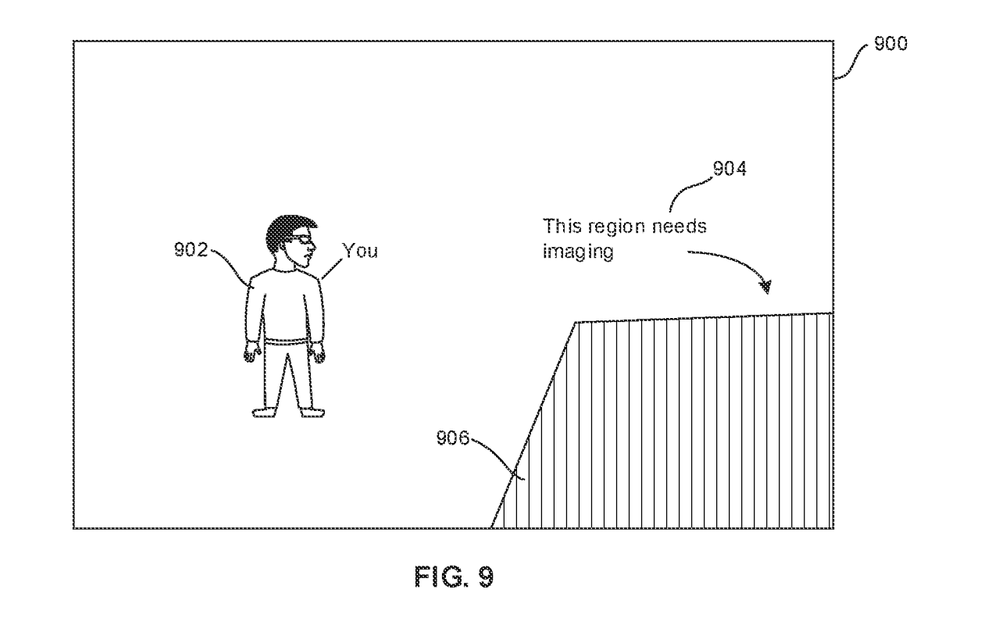
FIG. 9 illustrates a screen shot consistent with present principles.

FIG. 9 illustrates a display 900 which may be implemented by any of the displays described herein to identify for a user, whose image or avatar 902 may be presented. A prompt 904 may indicate that a region 906 of the physical space has not been imaged and requires imaging to complete the space map, so that the user can move toward the region 906 to image the region 906 with the camera on the user's HMA.

Figure 10:
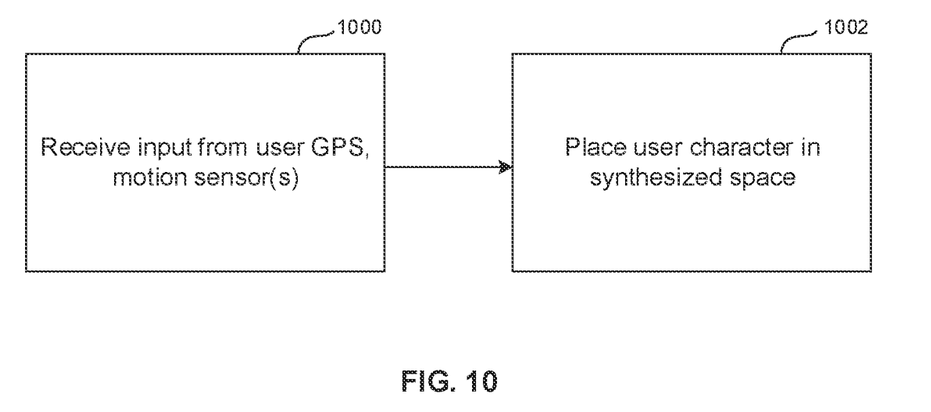
FIG. 10 illustrates example alternate logic consistent with present principles.

FIG. 10 illustrates a case in which only a single user may be present in a space that has been mapped. It will be appreciated that in such a circumstance, no external image of the user may be available, but the user may nonetheless wish to view himself from the vantage point of a virtual camera. Accordingly, at block 1000 input is received indicating the user's location and motion from, e.g., position receivers and IMUs on the user's HMA. A video from the desired vantage point is then generated at block 1002 according to principles described herein along with an avatar representing the user depicted at the user's location in space and moving according to the user's movements.

While particular techniques and machines are herein shown and described in detail, it is to be understood that the subject matter which is encompassed by the present invention is limited only by the claims.

What is claimed is:

1. An apparatus comprising:
at least one processor programmed with instructions which are executable by the at least one processor to:
identify at least a location in space as identified by a user and being distanced from a head-mounted apparatus worn by the user, the location in space not being co-located with a physical camera;
access plural videos of the space generated by respective plural cameras to generate a synthesized video of the space from a vantage point of the location in space, wherein the plural cameras are mounted on respective head-mounted apparatuses; and
display the synthesized video on at least one of the head-mounted apparatus.

2. The apparatus of claim 1, wherein the head-mounted apparatus comprises an augmented reality head-mounted display (HMD).

3. The apparatus of claim 1, wherein the head-mounted apparatus comprises an augmented reality eyeglasses.

4. The apparatus of claim 1, wherein the vantage point comprises a location and an orientation of a simulated camera.

5. The apparatus of claim 1, wherein the instructions are executable to:
identify the location in space based at least in part on imaging light from a laser.

6. The apparatus of claim 1, wherein the instructions are executable to:
identify the location in space based at least in part on imaging a gesture of a wearer of the head-mounted apparatus.

7. The apparatus of claim 1, wherein the instructions are executable to:
identify the location in space based at least in part on imaging eyes of a wearer of the head-mounted apparatus.

8. The apparatus of claim 1, wherein the instructions are executable to:
present on the head-mounted apparatus an indication of a region in space requiring video imaging.

9. The apparatus of claim 1, wherein the instructions are executable to:
identify location and motion of the user; and
include in the synthesized video an avatar representing the user depicted at the location of the user in space and moving according to the motion of the user.

10. The apparatus of claim 1, wherein the instructions are executable to:
identify the location in space based at least in part on a voice signal.

11. An assembly comprising:
at least first and second head-mounted devices (HMD), each comprising at least one respective camera;
at least one processor programmed with instructions executable to configure the processor to:

identify at least a location in space at which no physical camera is located;
generate, using images from the cameras of the HMDs, a video from a vantage point of the location in space; and
present the video on at least one of the HMDs.

12. The assembly of claim 11, wherein the vantage point comprises a location and an orientation of a simulated camera.

13. The assembly of claim 11, wherein the instructions are executable to:
identify the location in space based at least in part on imaging light from a laser.

14. The assembly of claim 11, wherein the instructions are executable to:
identify the location in space based at least in part on imaging a gesture of a wearer of one of the HMDs.

15. The assembly of claim 11, wherein the instructions are executable to:
identify the location in space based at least in part on imaging eyes of a wearer of one of the HMDs.

16. The assembly of claim 11, wherein the instructions are executable to:
present on at least one of the HMDs an indication of a region in space requiring video imaging.

17. A method comprising:
generating a synthesized video from plural videos of a space taken by respective cameras, the synthesized video being from a vantage point distanced from respective locations of the respective cameras based on an identification of the vantage point by a user; and
presenting the synthesized video on a head-mounted apparatus worn by the user, the head-mounted apparatus being distanced from the vantage point.

18. The method of claim 17, wherein the cameras are mounted on respective head-mounted apparatuses.

19. The method of claim 17, comprising:
identifying the vantage point at least in part based on imaging light from a laser.

20. The method of claim 17, comprising:
identifying the vantage point at least in part based on imaging the user.

* * * * *